United States Patent [19]
Meininger et al.

[11] 3,888,862
[45] June 10, 1975

[54] WATER-SOLUBLE REACTIVE XANTHENE DYESTUFFS AND PROCESS FOR PREPARING THEM

[75] Inventors: Fritz Meininger, Frankfurt am Main; Folker Kohlhaas, Kelkheim, Taunus, both of Germany

[73] Assignee: Hoechst Aktiengesellschaft, Frankfurt am Main, Germany

[22] Filed: June 30, 1972

[21] Appl. No.: 267,958

[30] Foreign Application Priority Data
July 2, 1971   Germany............................. 2132963

[52] U.S. Cl. .......... 260/281; 260/240.1; 260/239.8; 260/249; 260/249.5; 260/250 A; 260/256.5 R; 260/262; 260/272; 260/283 S; 260/283 SA; 260/287 R; 260/288 R; 260/289 R; 8/12; 8/54.2; 8/37; 8/63; 8/162 R

[51] Int. Cl.............................................. C07d 35/00
[58] Field of Search..................................... 260/281

[56] References Cited
UNITED STATES PATENTS

| | | | |
|---|---|---|---|
| 2,096,295 | 10/1937 | Eckert et al. ........................ | 260/281 |
| 2,657,205 | 10/1953 | Heyna et al......................... | 260/185 |
| 3,759,953 | 9/1973 | Troster ........................... | 260/281 X |

*Primary Examiner*—J. A. Narcavage
*Attorney, Agent, or Firm*—Curtis, Morris & Safford

[57] ABSTRACT

Novel water-soluble, reactive xanthene dyestuffs for the dyeing or printing of leather, wool, silk, polyamide, polyurethane or cellulose fibers.

6 Claims, No Drawings

WATER-SOLUBLE REACTIVE XANTHENE DYESTUFFS AND PROCESS FOR PREPARING THEM

The present invention relates to new reactive xanthene dyestuffs of the general formula (1)

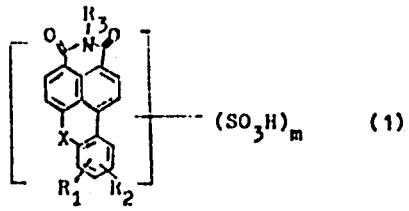

in which $R_1$ and $R_2$, which may be identical or different, represent hydrogen atoms, halogen atoms, preferably chlorine or bromine atoms, or alkyl or alkoxy groups, preferably those containing 1–4 carbon atoms in the alkyl chain, X represents an oxygen or sulfur atom or a CO-group, $m$ is a number from 1–3, and $R_3$ is a group of the general formula (2)

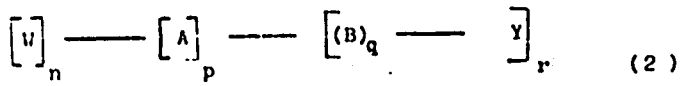

in which W represents a bivalent bridge member such as, for example, the groups $-CH_2-CH_2-$ and $-CH_2-CH_2-CH_2-$. A represents a bivalent, mono- or binuclear aromatic group, for example a phenylene or naphthylene group or a bivalent diphenyl, diphenyl ether, diphenylamine, diphenyl sulfide or diphenyl sulfone group, in which the group A in the aromatic nuclei may be substituted by halogen atoms, preferably chlorine or bromine atoms, lower alkyl, lower alkoxy, hydroxyl, carboxyl, sulfo or nitro groups. B represents a bivalent bridge member such as $-CH_2-$, $-CH_2-CH_2-$ or $-NR_4-$, $R_4$ being a hydrogen atom or an optionally substituted lower alkyl group, preferably a methyl, ethyl, β-hydroxyethyl or β-sulfoethyl group. Y represents a reactive group, and $n$, $p$ and $q$ stand for 0 or 1 and $r$ stands for 1 or 2.

Under reactive groups Y, there are to be understood those which contain one or several reactive groups or substituents that can be split-off and which, upon application of the dyestuffs on cellulose materials in the presence of acid-binding agents and optionally under the action of heat, react with the hydroxyl groups of cellulose while forming covalent bonds or upon application on super-polyamide fibers such as wool, react with the NH group of these fibers. A great number of such fibre-reactive groupings is known from literature.

Reactive groups which are suitable according to the invention and which contain at least one such substituent, which is capable of being split-off and which is bound to a heterocyclic or aliphatic group, are among others those which contain at least one reactive substituent bound to a 5- or 6-membered heterocyclic ring, such as the monoazine, diazine, triazine ring, for example, a pyridine, pyrimidine, pyridazine, pyrazine, thiazine, oxazine or an asymmetrical or symmetrical triazine ring or to such a ring system which contains one or several annellated aromatic rings such as a quinoline, phthalazine, cinnoline, quinoazoline, quinoxaline, acridine, phenazine and phenanthridine ring system; accordingly, the 5- or 6-membered heterocyclic rings which contain at least one reactive substituent are preferably those which contain one or several nitrogen atoms, and 5- or, preferably, 6-membered annellated carboxylic rings. Among the reactive substituents of the heterocycle, there may be mentioned, for example halogen (Cl, Br of F), ammonium, including hydrazinium, sulfonium, sulfonyl, azido ($N_3$), rhodanido, thio, thio-ether, oxy-ether, sulfinic acid and sulfonic acid. In particular there may be mentioned, for example 3-chloro- and 3,6-dichloro-1,2-diazinyl groups, mono- or dihalogeno symmetrical triazinyl groups, for example 2,4-dichlorotriazinyl-6, 2-amino-4-chlorotriazinyl-6, 2-alkylamino-4-chlorotriazinyl-6, such as 2-methylamino-4-chlorotriazinyl-6, 2-ethylamino- or 2-propylamino-4-chlorotriazinyl-6, 2-β-oxethylamino-4-chlorotriazinyl-6, 2-di-β-oxethylamino-4-chlorotriazinyl-6 and the corresponding sulfuric acid semi-esters, 2-diethylamino-4-chlorotriazinyl-6, 2-morpholino- or 2-piperidino-4-chlorotriazinyl-6, 2-cyclohexylamino-4-chlorotriazinyl-6, 2-arylamino and substituted arylamino-4-chlorotriazinyl-6, such as 2-phenylamino-4-chlorotriazinyl-6, 2-(o-, m- or p-carboxy- or sulfophenyl)-amino-4-chlorotriazinyl-6, 2-alkoxy-4-chlorotriazinyl-6, such as 2-methoxy- or ethoxy-4-chlorotriazinyl-6, 2-(phenylsulfonylmethoxy)-4-chlorotriazinyl-6, 2-aryloxy- and substituted aryloxy-4-chlorotriazinyl-6, such as 2-phenoxy-4-chlorotriazinyl-6, 2-(p-sulfophenyl)-oxy-4-chlorotriazinyl-6, 2-(o-, m- or p-methyl- or-methoxyphenyl)-oxy-4-chlorotriazinyl- 6, 2-alkylmercapto- or 2-arylmercapto- or 2-(substituted aryl)-mercapto-4-chlorotriazinyl-6, such as 2-β-hydroxyethyl)-mercapto-4-chlorotriazinyl-6, 2-phenylmercapto-4-chlorotriazinyl-6, 2-(4'-methylphenyl)-mercapto-4-chlorotriazinyl-6, 2-(4'-methylphenyl)-mercapto-4-chlorotriazinyl-6, 2-(2',4'-dinitro)-phenylmercapto-4-chlorotriazinyl-6, 2-methyl-4-chlorotriazinyl-6, 2-phenyl-4-chlorotriazinyl-6, mono-, di- or trihalogenopyrimidinyl groups, such as 2,4-dichloropyrimidinyl-6, 2,4,5-trichloropyrimidinyl-6, 2,4-dichloro-5-nitro- or -5-methyl- or -5-carboxymethyl- or -5-carboxy- or -5-cyano- or -5-vinyl or -5-sulfo- or -5-mono-, -di- or -trichloromethyl- or -5-carbo-alkoxy-pyrimidinyl-6, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-6-carbonyl, 2,3-dichloroquinoxaline-6-sulfonyl, 1,4-dichlorophthalazine-6-sulfonyl or -6-carbonyl, 2,4-dichloroquinazoline-7- or -6-sulfonyl or -carbonyl, 2- or 3- or 4-(4',5'-dichloropyridazone-6'-yl-1')-phenylsulfonyl or -carbonyl, β-(4',5'-dichloropuridazone-6'-rl-1')-ethylcarbonyl N-methyl-N-(2,4-dichlorotriazinyl-6-)-carbamyl, N-methyl-N-(2-methylamino-4-chlorotriazinyl-6-)-carbamyl, N-methyl-N-(2-dimethylamino-4-chlorotriazinyl-6-)- carbamyl, N-methyl- or N-ethyl-n-(2,4-dichlorotriazinyl-6)-aminoacetyl, N-methyl-N-(2,3-dichloroquinoxaline-6-sulfonyl)-aminoacetal, N-methyl-N-(2,3-dichloroquinoxaline-6-carbonyl)-aminoacetal, such as the corresponding bromo- and fluoro- derivatives of the above-mentioned chloro-substituted heterocyclic groups, among these, for example 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloro-methyl-4-pyrimidinyl, 2,6-difluoro-5-chloro-methyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or 5-methylsulfonyl-4-pyrimidinyl, 2-fluoro-5-carbonamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carbonamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; sulfonyl groups containing triazine groups, such as 2,4-bis-(phenylsulfonyl)-triazinyl-6, 2-(3'-carboxyphenyl)-sulfonyl-4-chlorotriazinyl-6, 2-(3'-sulfophenyl)-sulfonyl-4-chlorotriazinyl-6, 2,4-bis-(3'-carboxyphenylsulfonyl-1')-triazinyl-6; sulfonyl groups containing pyrimidine rings, such as 2-carboxymethylsulfonyl-pyrimidinyl-4, 2-methylsulfonyl-6-methyl-pyrimidinyl-4, 2-methyl-sulfonyl-6-ethyl-pyrimidinyl-4, 2-phenylsulfonyl-5-chloro-6-methyl-pyrimidinyl-4, 2,6-bis-methyl-sulfonyl-pyrimidinyl-4, 2,6-bis-methylsulfonyl-5-chloro-pyrimidinyl-4, 2,4-bis-methylsulfonyl-pyrimidine-5-sulfonyl, 2-methylsulfonylpyrimidinyl-4, 2-phenyl-sulfonyl-pyrimidinyl-4, 2-trichloromethylsulfonyl-6-methyl-pyrimidinyl-4, 2-methylsulfonyl-5-chloro-6-methyl-pyrimidinyl-4, 2-methylsulfonyl-5-bromo-6-methylpyrimidinyl-4, 2-methylsulfonyl-5-chloro-6-ethyl-pyrimidinyl-4, 2-methylsulfonyl-5-chloro-6-chloromethyl-pyrimidinyl-4, 2-methylsulfonyl-4-chloro-6-methyl-pyrimidine-5-sulfonyl, 2-methylsulfonyl-5-nitro-6-methyl-sulfonyl, 2,5,6-trismethylsulfonyl-pyrimidinyl-4, 2-methylsulfonyl-5,6-dimethylpyrimidinyl-4, 2-ethylsulfonyl-5-chloro-6-methyl-pyrimidinyl-4, 2-methylsulfonyl-6-chloro-pyrimidinyl-4, 2,6-bis-methylsulfonyl-5-chloro-pyrimidinyl-4, 2-methylsulfonyl-6-carboxypyrimidinyl-4, 2-methylsulfonyl-5-sulfo-pyrimidinyl-4, 2-methylsulfonyl-6-carbomethoxy-pyrimidinyl-4, 2-methylsulfonyl-5-carboxy-pyrimidinyl-4, 2-methylsulfonyl-5-cyano-6-methoxypyrimidinyl-4, 2-methylsulfonyl-5-chloro-pyrimidinyl-4, 2-sulfoethylsulfonyl-6-methyl-pyrimidinyl-4, 2-methylsulfonyl-5-bromo-pyrimidinyl-4, 2-phenylsulfonyl-5-chloro-pyrimidinyl-4, 2-carboxymethylsulfonyl-5-chloro-6-methyl-pyrimidinyl-4, 2-methylsulfonyl-6-chloropyrimidine-4- and -5-carbonyl, 2,6-bis-(methylsulfonyl)-pyrimidine-4- or -5-carbonyl 2-ethylsulfonyl-6-chloropyrimidine-5-carbonyl, 2,4-bis-(methylsulfonyl)-pyrimidine-5-sulfonyl, 2-methylsulfonyl-4-chloro-6-methyl-pyrimidine-5-sulfonyl or -carbonyl; ammonium-groups-containing triazine rings, such as 2-trimethylammonium-4-phenylamino- or -4-(o-, m- or p-sulfophenyl)-aminotriazinyl-6, 2-(1,1,dimethylhydrazinium)-4-phenylamino- or -4-(o-, m- or p-sulfophenyl)-aminotriazinyl-6, 2-(2-isopropylidene-1,1-dimethyl)-hydrazinium-4-phenylamino- or -4-(o-, m- or p-sulfophenyl)-aminotriazinyl-6, 2-N-aminopyrrolidinium- or 2-N-aminopiperidinium-4-phenylamino- or -4-(o-, m- or p-sulfophenyl)-aminotriazinyl-6, furthermore, 4-phenylamino- or 4-(sulfophenylamino)-triazinyl-6 groups, which contain in 2-position the 1,4-bis-azabicyclo-/2,2,2/-octane or the 1,2-bis-aza-bicyclo-/0,3,3/-octane group bound quarternarily over a nitrogen bond, 2-pyridinium-4-phenylamino or -4-(o-, m- or p-sulfophenyl)-amino-triazinyl-6 or corresponding 2-oniumtriazinyl-6 groups which are substituted in 4-position by alkylamino groups such as methylamino, ethylamino or β-hydroxy-ethylamino, or alkoxy groups, such as methoxy or ethoxy, or aroxy groups, such as phenoxy or sulfophenoxy groups; 2- or 3-mono-chloro- or 2,3-dichloroquinoxaline derivatives and the corresponding bromine compounds; 2-chlorobenzthiazole-5- or -5-carbonyl- or -5- or -6-sulfonyl-, 2-arylsulfonyl- or -alkylsulfonyl-benzthiazole-5 or -6-carbonyl or -5- or -6-sulfonyl groups such as 2-methylsulfonyl or 2-ethylsulfonyl-benzthiazole-5 or -6-sulfonyl or -carbonyl, 2-phenylsulfonyl-benzthiazole-5 or -6-sulfonyl or carbonyl and the corresponding sulfo-groups containing 2-sulfonylbenzthiazole-5- or -6-carbonyl- or -sulfonyl-derivatives, in the annellated benzene nucleus, 2-chlorobenzoxazole-5- or -6-carbonyl or -sulfonyl, 2-chlorobenzimidazole-5- or -6-carbonyl or sulfonyl, 2-chloro-1-methylbenzimidazole-5- or -6-carbonyl or sulfonyl, 2-chloro-4-methylthiazole-(1,3)-5-carbonyl or -4- or -5-sulfonyl, N-oxide of 4-chloro- or 4-nitroquinoline-5-carbonyl.

Furthermore, there are mentioned the reactive groups of the aliphatic series, such as acryloyl, mono-, di- or trichloroacryloyl such as —CO—CH=CH—Cl, —CO—CCl=CH$_2$, —CO—CCl=CH—CH$_3$, furthermore, —CO—CCl=CH—COOH, —CO—CH=C-Cl—COOH, β-chloropropionyl, 3-phenylsulfonylpropionyl, 3-methylsulfonylpropionyl, 3-phenylsulfonylpropionyl, β-sulfato-ethylaminosulfonyl, vinylsulfonyl, β-chloroethyl-sulfonyl, β-sulfatoethylsulfonyl, β-phosphatoethylsulfonyl, β-methylsulfonyl-ethylsulfonyl, β-phenylsulfonylethylsulfonyl, 2-fluoro-2-chloro-3,3-difluorocyclobutane-1-carbonyl,(2,2,3,3-tetrafluorocyclobutyl-1-)acryloyl, β-(2,2,3,3-tetrafluoro-4-methyl-cyclobutyl-1-)acryloyl, α- or β-bromoacryloyl, α- or β-alkyl- or arylsulfonyl-acryloyl groups, such as α-or β-methylsulfonylacryloyl and β-chloro-ethylsulfonyl-[2,2,1]-bicycloheptyl.

The new xanthene dyestuffs of the above-specified formula (1) may be prepared by condensation of compounds of the formula (3) or (3a)

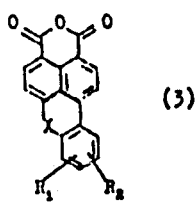  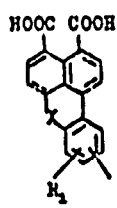

with the amines of the formula (4) or (5), $R_1$, $R_2$, W, A, B, Y, $n$, $p$, $q$ and $r$ having the meanings given above, at a molar ratio of 1:1 or with an excess quantity of an amine of the formula (4) or (5)

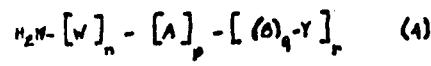

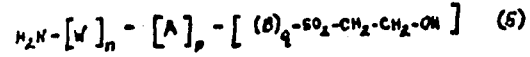

in water or in an organic solvent such as methanol, ethanol, isopropanol or in an ethyleneglycol-monoalkyl ether, dimethylformamide or dimethylsulfoxide as described in German Patent No. 1,297,259, by isolation of the reaction products in the usual manner and by treatment of the products with concentrated or fuming sulfuric acid at room temperature or at an elevated temperature, the degree of sulfuration depending on the temperature used, the concentration of the sulfuric acid and the reaction time. Suitably, the sulfuration is carried out at temperatures in the range of from about 20°C to about 170°C using 95 percent fuming sulfuric acid with a $SO_3$ content of up to about 20 percent.

Another process for preparing the dyestuffs of the general formula (1) comprises reacting compounds of the formula (6)

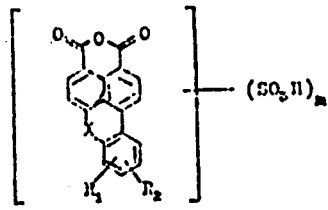

which are obtained in known manner from the compounds of the formula (3) or (3a), with amines of the formula (4) at a molar ratio of 1:1 or with an excess of the amine of the formula (4) in water at elevated temperatures, optionally under pressure.

Further variants of the preparation of the product of the invention comprise the reaction of the sulfonic acids of the general formula (6) with the amines (a) of the formula (7).

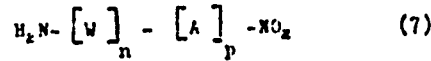

(b) of the formula (8)

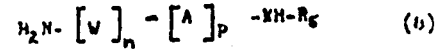

or (c) of the formula (5)

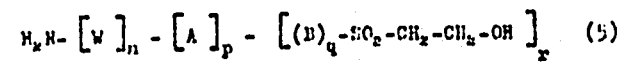

in which W, A, B, $n$, $p$, $q$ and $r$ have the meanings given above and $R_3$ stands for an acyl group, for example the acetyl group, at a molar ratio of 1:1 or with an excess of amines of the formula (7), (8) or (5), in water at an elevated temperature, optionally in the presence of a condensing agent such as sodium acetate and optionally under pressure. The compounds obtained in the case (a) are then transformed by reduction according to known processes into compounds of the formula (10)

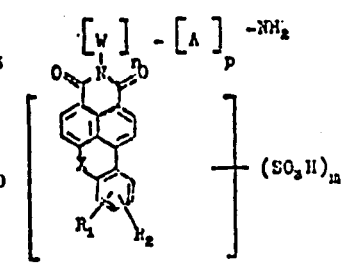

and the compounds obtained in the case (b) are likewise transformed by hydrolysis in known manner into compounds of the formula (10). The compounds obtained according to method (c) correspond to the formula (11).

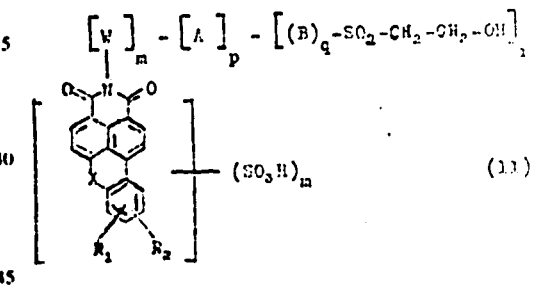

The dyestuffs of the invention corresponding to the formula (1) are prepared from the intermediate products of the formula (10) by condensation with a reactive component of the general formula (12)

$$Z - Y \quad (12)$$

in which Z represents a substituent that may be split-off and Y stands for reactive groups of the meaning given above.

Reactive components of the formula (12) which are suitable for the above purpose are, for example, those on which the aforementioned reactive groups Y are based, i.e., in general the halides and in particular the chlorides of the acyl components Y. From the great number of the available compounds, there may be mentioned here, in particular, diazine such as 3-chloro-1,2-diazine-6-carboxylic acid chloride, 3,6-dichloro-1,2-diazine-4-carboxylic acid chloride, trihalogeno-symmetrical triazines such as cyanur chloride and cyanur bromide, dihalogeno-monoamino and mono-substituted amio-symmetrical triazines such as 2,6-dichloro-4-amino-triazine, 2,6-dichloro-4-methylaminotriazine, 2,6-dichloro-4-ethylaminotriazine, 2,6-dichloro-4-oxethyl-aminotriazine, 2,6-dichloro-4-phenylaminotriazine, 2,6-dichloro-4-(o-, m- or p-sulfophenyl)-aminotriazine, 2,6-dichloro-4-(2',3'-, -2', 4'-, -3', 4'- or -3',5'-disulfo-phenyl)-aminotriazine, dihalogenoalkoxy- and -aryloxy-sym.-triazine, such as 2,6-dichloro-4-methoxytriazine, 2,6-dichloro-4-ethoxytriazine, 2,6-dichloro-4-phenoxytriazine, 2,6-dichloro-4-(o-, m- or p-sulfophenyl)-oxytriazine, dihalogeno-alkylmercapto- and -arylmercapto-sym.triazines, such as 2,6-dichloro-4-ethylmercapto-triazine, 2,6-dichloro-4-phenylmercaptotriazine, 2,6-dichloro- 4-(p-methylphenyl)-mercaptotriazine; tetrahalogenopyrimidines such as tetrachloro-, tetrabromo- or tetrafluoro-pyrimidine, 2,4,6-trihalogenopyrimidine such as 2,4,6-trichloro-, tribromo- or -trifluoro-pyrimidine, dihalogenopyrimidines such as 2,4-dichloro- -dibromo- or -difluoropyrimidine; 2,4,6-trichloro-5-nitro- or -5-methyl- or -5-carbomethoxy- or -5-carboethoxy- or -5-carboxymethyl- or -5-mono-, -di- or -trichloromethyl- or -5-carboxy- or -5-sulfo- or -5-cyano- or -5-vinyl-pyrimidines 2,4-difluoro-6-methylpyrimidine, 2,6-difluoro-4-methyl-5-chloro-pyrimidine, 2,4-difluoro-pyrimidine-5-ethylsulfone, 2,6-difluoro-4-chloropyrimidine, 2,4,6-trifluoro-5-chloropyrimidine, 2,6-difluoro-4-methyl-5-bromopyrimidine, 2,4-difluoro-5,6-dichloro- or -dibromopyrimidine, 4,6-difluoro-2,5-dichloro- or dibromopyrimidine, 2,6-difluoro-4-bromopyrimidine, 2,4,6-trifluoro-5-bromopyrimidine, 2,4,6-trifluoro-5-chloromethyl-pyrimidine, 2,4,6-trifluoro-5-nitropyrimidine, 2,4,6-trifluoro-5-cyanopyrimidine, 2,4,6-trifluoropyrimidine-5-carboxylic acid-alkyl ester or -5-carboxylic acid amide, 2,6-difluoro-5-methyl-4-chloropyrimidine, 2,4,6-trifluoro-5-chloropyrimidine, 2,4,6-trifluoro-5-methylpyrimidine, 2,4,5-trifluoro-6-methylpyrimidine, 2,4-difluoro-5-nitro-6-chloropyrimidine, 2,4-difluoro-5-cyanopyrimidine, 2,4-difluoro-5-methylpyrimidine, 6-trifluoromethyl-5-chloro-2,4-difluoropyrimidine, 6-phenyl-2,4-difluoropyrimidine, 6-trifluoromethyl-2,4-difluoropyrimidine, 5-trifluoromethyl-2,4,6-trifluoropyrimidine, 2,4-difluoro-5-nitro-pyyrimidine, 2,4-difluoro-5-trifluoromethyl-pyrimidine, 2,4-difluoro-5-methylsulfonyl-4-pyrimidine, 2,4-difluoro-5-phenyl-pyrimidine 2,4-difluoro-5-carbonamidopyrimidine, 2,4-difluoro-5-carbomethoxy-pyrimidine, 2,4-difluoro-6-trifluoromethyl-pyrimidine, 2,4-difluoro-5- bromo-6-trifluoromethyl-pyrimidine, 2,4-difluoro-6-carbonamido-pyrimidine, 2,4-difluoro-6-carbomethoxy-pyrimidine, 2,4-difluoro-6-phenyl-pyrimidine, 2,4-difluoro-6-cyano-pyrimidine, 2,4,6,-trifluoro- 5-methylsulfonyl-pyrimidine, 2,4-difluoro-5-sulfoamido-pyrimidine, 2,4-difluoro-5-chloro-6-carbomethoxy-pyrimidine, 5-trifluoromethyl-2,4-difluoropyrimidine, 2,4-dichloropyrimidine-5-carboxylicacid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride, 2,6-dichloro-pyrimidine-4-carboxylic acid chloride; pyrimidine reactive components the sulfonyl groups of which may be splitoff, such as 2-carboxymethylsulfonyl-4-chloropyrimidine, 2-methylsulfonyl-4-chloro-6-methylpyrimidine, 2,4-bis-methylsulfonyl-6-methylpyrimidine, 2,4-bis-phenylsulfonyl-5-choro-6-methylpyrimidine, 2,4,6-tris-methylsulfonylpyrimidine, 2,6-bismethylsulfonyl-4,5-dichloropyrimidine, 2,4-bis-methylsulfonylpyrimidine-5-sulfonic acid chloride, 2-methylsulfonyl-4-chloropyrimidine, 2-phenylsulfonyl-4-chloropyrimidine, 2,4-bis-trichloromethylsulfonyl-6-methylpyrimidine, 2,4-bis-methylsulfonyl-5-chloro-6-methyl-pyrimidine, 2,4-bis-methylsulfonyl-5-bromo-6-methyl-pyrimidine, 2-methylsulfonyl-4,5-dichloro-6-methylpyrimidine, 2-methylsulfonyl-4,5-dichloro-6-chloromethylpyrimidine, 2-methylsulfonyl-4-chloro-6-methylpyrimidine-5-sulfonic acid chloride, 2-methylsulfonyl-4-chloro-5-nitro-6-methylpyrimidine, 2,4,5,6-tetramethylsulfonyl-pyrimidine, 2-methylsulfonyl-4-chloro-5,6-dimethylpyrimidine, 2-ethylsulfonyl-4,5-dichloro-6-methylpyrimidine, 2-methylsulfonyl-4,6-dichloropyrimidine, 2,4,6-tris-methylsulfonyl-5-chloropyrimidine, 2-methylsulfonyl-4-chloro-6-carboxypyrimidine, 2-methylsulfonyl-4-chloropyrimidine-5-sulfonic acid, 2-methylsulfonyl-4-chloro-6-carbomethoxypyrimidine, 2-methylsulfonyl-4-chloro-pyrimidine-5-carboxylic acid, 2-methylsulfonyl-4-chloro-5-cyano-6-methoxypyrimidine, 2-methylsulfonyl-4,5-dichloropyrimidine, 4,6-bismethylsulfonylpyrimidine, 4-methylsulfonyl-6-chloropyrimidine, 2-sulfoethylsulfonyl-4-chloro-6-methylpyrimidine, 2-methylsulfonyl-4-chloro-5-bromopyrimidine, 2-methylsulfonyl-4-chloro-5-bromo-6-methylpyrimidine, 2,4-bis-methylsulfonyl-5-chlropyrimidine, 2-phenylsulfonyl-4,5-dichloropyrimidine, 2-phenylsulfonyl-4,5-dichloro-6-methylpyrimidine, 2-carboxymethylsulfonyl-4,5-dichloro-6-methylpyrimidine, 2-(2'- or 3'- or 4'carboxyphenylsulfonyl)-4,5-dichloro-6-methylpyrimidine, 2,4-bis-(2'- or 3'- or 4'-carboxyphenylsulfonyl)-5-chloro-6-methylpyrimidine, 2-methylsulfonyl-6-methylpyrimidine, 2-methylsulfonyl-6-chloropyrimidine-4- or -5-carboxylic acid chloride, 2-ethylsulfonyl-6-chloropyrimidine-4- or -5-carboxylic acid chloride, 2,6-bis-(methylsulfonyl)-pyrimidine-4-carboxylic acid chloride, 2-methylsulfonyl-6-methyl-4-chloro- or -4-bromopyrimidine-5-carboxylic acid chloride or -bromide, 2,6-bis-(methylsulfonyl)-4-chloropyrimidine-5-carboxylic acid chloride; further reactive components of the heterocyclic series with reactive sulfonyl substituents are, for example 3,6-bis-phenylsulfonyl-pyridazine, 3-methylsulfonyl-6-chloropyridazine, 3,6-bis-trichloromethylsulfonyl-pyridazine, 3,6-bis-methylsulfonyl-4-methylpyridazine, 2,5,6-tris-methylsulfonylpyrazine, 2,4-bis-methylsulfonyl-1,3,5-triazine, 2,4-bis-methylsulfonyl-6-(3'-sulfophenylamino)-1,3,5-triazine, 2,4-bis-methylsulfonyl-6-N-methylanilino-1,3,5-triazine, 2,4-bis-methylsulfonyl-6-phenoxy-1,3,5-triazine, 2,4-bis-methylsulfonyl-6-trichloroethoxy-1,3,5-triazine, 2,4,6-tris-phenylsulfonyl-1,3,5-triazine, 2,4-bis-methylsulfonylquinazoline, 2,4-bis-trichloromethylsulfonylquinoline, 2,4-bis-carboxymethylsulfonylquinoline, 2,6-bis-(methylsulfonyl)-pyridine-4-carboxylic acid chloride and 1-(4'-chlorocarbonylphenyl- or 2'-chlorocarbonylethyl)-4,5-bis-methylsulfonylpyridazone-(6); further heterocyclic reactive components with mobile halogen are among others 2- or 3-monochloroquinoxaline-6-carboxylic acid chloride or -6-sulfonic acid chloride, 2- or 3-monobromoquinoxaline-6-carboxylic acid bromide or -6-sulfonic acid bromide,2,3-dichloroquinoxaline-6-carboxylic acid chloride or -6-sulfonic acid chloride, 2,3-dibromoquinoxaline-6-carboxylic acid bromide or -6-sulfonic acid bromide, 1,4-dichlorophthalazine-6-carboxylic acid chloride or -6-sulfonic acid chloride and the corresponding bromine compounds, 2,4-dichloroquinazoline-6- or -7-carboxylic acid chloride or -sulfonic acid chloride and the corresponding bromine compounds, 2- or 3- or 4-(4', 5'-dichloropyridazone-6'-yl-1')-phenylsulfonic acid chloride or -carboxylicacid chloride and the corresponding bromine compounds, β-(4',5'-dichloropyridazone-6'-yl-1')-ethylcarboxylic acid chloride, 2-chloroquinoxaline-3-carboxylic acid chloride and the corresponding bromine compounds, N-methyl-N-(2,4-dichlorotriazinyl-6)-carbamidic acid chloride, N-methyl-N-( 2-chloro-4-methylaminotriazinyl-6)-carbamidic acid chloride, N-methyl-N-(2-chloro-4-dimethylamino-triazinyl-6)-carbamidic acid chloride, N-methyl- or N-ethyl-N-(2,4-dichlorotriazinyl-6)-aminoacetyl chloride, N-methyl-, N-ethyl- or N-hydroxyethyl-N-(2,3-dichloroquinoxaline-6-sulfonyl- or -6-carbonyl)-aminoacetyl chloride and the corresponding bromine derivatives, further 2-chlorobenzthiazole-5- or -6-carboxylic acid chloride or -5- or -6-sulfonic acid chloride and the corresponding bromine compounds, 2-arylsulfonyl- or 2-alkylsulfonyl-benzthiazole-5- or -6-carboxylic acid -5- or -6-sulfonic acid chloride, such as 2-methylsulfonyl- or 2-ethylsulfonyl- or 2-phenylsulfonyl-benzthiazole-5- or -6-sulfonic acid chloride or -5- or -6-carboxylic acid chloride as well as the corresponding 2-sulfonylbenzthiazole derivatives containing sulfonic acid groups in the annellated benzene ring. 3,5-bis-methylsulfonyl-isothiazole-4-carboxylic acid chloride, 2-chlorobenzoxazole-5- or -6-carboxylic acid chloride or -sulfonic acid chloride as well as the correspondig bromine derivatives. 2-chlorobenzimidazole-5- or -6-carboxylic acid chloride or -sulfonic acid chloride as well as the corresponding bromine derivatives, 2-chloro-1-methylbenzimidazole-5- or -6-carboxylic acid chloride or -sulfonic acid chloride as well as the corresponding bromine derivatives, 2-chloro-4-methylthiazole-(1,3)-5-carboxylic acid chloride or -4- or -5-sulfonic acid chloride, 2-chlorothiazole-4- or -5-sulfonic acid chloride and the corresponding bromine derivatives.

From the series of aliphatic reactive components, there may be mentioned, for example: acrylic acid chloride, mono-, di- or trichloro-acrylic acid chloride, 3-chloropropionic acid chloride, 3-phenylsulfonyl-propionic acid chloride, 3-methylsulfonyl-propionic acid chloride, 3-ethylsulfonyl-propionic acid chloride, 3-chloroethane-sulfochloride, chloromethane sulfochloride, 2-chloroacetyl chloride, 2,2,3,3-tetrafluorocyclobutane-1-carboxylic acid chloride, β-(2,2,3,3-tetrafluorocyclobutyl-1)-acrylic acid chloride, β-(2,3,3-trifluoro-2-chlorocyclobutane-1)-carboxylic acid chloride, β-methylsulfonyl acrylic acid chloride, α-methylsulfonyl-acrylic acid chloride, α-bromoacrylic acid chloride,β-bromoacrylic acid chloride and β-chloroethylsulfonyl-chlorocarbonyl [2.2.1]-cycloheptane These condensation reactions are carried out, in general, in an aqueous, organic or aqueous-organic medium in the weakly alkaline, neutral or weakly acid range.

The dyestuffs of the formula (1) of the present invention are obtained from the intermediate product of the formula (11) by treatment with sulfating agents, phosphorylating agents, halogenating agents, alkyl- or arylsulfonic acid halides or -carboxylic acid halides or -carboxylic acid anhydrides, Y standing for the group —SO$_2$CH$_2$CH$_2$OSO$_3$H, SO$_2$CH$_2$CH$_2$OPO$_3$H$_2$, —SO$_2$CH$_2$CH$_2$-halogen or —SO$_2$CH$_2$CH$_2$O-acyl. The dyestuffs so-obtained may be converted by treatment with agents having an alkaline action, for example alkali-metal hydroxides or alkali-metal carbonates such as sodium hydroxide or sodium carbonate, into dyestuffs of the general formula (1), in which Y stands for thhe grouping —SO$_2$—CH=CH$_2$, and the dyestuffs so obtained may be converted by the reaction (addition) with salts of thiosulfuric acid, such as sodium thiosulfate, with dialkyl-amines, such as dimethyl- or diethyl-amine, or with phenol, into dyestuffs of the general formula (1) in which Y represents —SO$_2$CH$_2$CH$_2$SSO$_3$H, —SO$_2$CH$_2$CH$_2$N(alkyl)$_2$ or

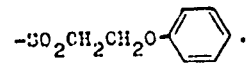

Suitable sulfating agents are, for example, concentrated sulfuric acid, chlorosulfonic acid, amidosulfonic acid, or sulfur-trioxide yielding compounds. Suitable phosphorylating agents are, for example concentrated phosphoric acid, pyro-, meta- or polyphosphoric acid, polyphosphoric acid alkyl esters, phosphoroxychloride or mixtures of phosphoric acid and phosphorus-(V)-oxide. As halogenating agents, there may be used, for example thionyl chloride or thionyl bromide.

The xanthene dyestuffs of the formula (1) obtained according to the processes of the invention are isolated by salting out, for example with sodium chloride or potassium chloride, or by spray-drying of the reaction mixture.

The new reactive xanthene dyestuffs of the general formula (1) are very well suited for the dyeing and printing of various fiber materials, for example wool, silk, leather, polyamide or polyurethane fibers, especially however, cellulose-containing fiber materials such as cotton, staple fiber and linen. For this purpose, they may be used according to the dyeing and printing methods commonly used in the art for reactive dyestuffs and yield on cellulose fiber materials, in the presence of alkaline agents, intense greenish yellow to reddish yellow dyeings and prints which have in part a high brilliancy and good properties of fastness, especially good fastness to wet processing.

The following Examples illustrate the invention.

EXAMPLE 1

15 Parts by weight of benzothioxanthene dicarboxylic acid-anhydride were stirred in 100 parts by weight of dimethylformamide with 21 parts by weight of 3-aminophenyl-β-oxethylsulfone and the whole was boiled for 6 hours under reflux. The condensation product that had formed was isolated by dilution with water, filtration and washing with water and alcohol. The dried and ground reaction product was introduced into 90 parts by weight of 20 percent oleum and stirred overnight at room temperature. The solution that had formed was poured over 400 parts by weight of ice, combined with 120 parts by weight of common salt (NaCl) and the dyestuff which had precipitated and which, in the form of the free acids, corresponded to the formula

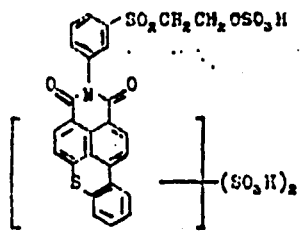

was stirred into 400 parts of water, neutralized with sodium acetate and salted out with sodium chloride. After drying and grinding, an orange red powder was obtained which dissolved in water to give a reddish yellow solution. Strongly diluted solutions thereof showed a green fluorescence.

30 Parts by weight of the dyestuff so-obtained were mixed with 80 parts by weight of urea and dissolved in 250 parts by weight of water at about 80°C. Into this solution, there were stirred at 40°C 400 parts by weight of a neutral alginate thickener and 15 parts by weight of sodium carbonate. This paste was printed on a cotton fabric which was then dried and steamed for 10 minutes, soaped and rinsed. A very brilliant reddish yellow print was obtained which showed very good fastness to washing treatments.

EXAMPLE 2

23 Parts by weight of benzothioxanthene-dicarboxylic acid-anhydride-disulfonic acid were boiled for 42 hours under reflux in 250 parts by weight of water with 38 parts by weight of sodium acetate and 12 parts by weight of 4-aminophenyl-β-oxethylsulfone. The condensation product that had formed was separated with sodium chloride, dried and ground and stirred into the 3-fold quantity by weight of monohydrate. After stirring overnight, the reaction mixture was poured on ice, worked-up with calcium carbonate and the dyestuff which, in the form of the free acid, corresponded to the formula

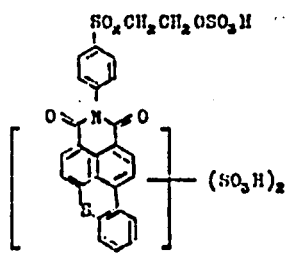

was salted out from the filtrate by means of potassium chloride. After drying and grinding, an orange red dyestuff powder was obtained which was found to dissolve in water to give a reddish yellow solution. Strongly diluted solutions showed a green fluorescence.

A cotton fabric was impregnated with a bath which contained, per liter, 40 g of the dyestuff so-obtained, 30 g of sodium sulfate and 16 ml of 32.5% sodium hydroxide solution, reeled onto a skein, wrapped in a plastic foil and allowed to dwell for 8 hours. After rinsing and souping, a very brilliant, reddish yellow dyeing having good properties of fastness to wet processing was obtained.

EXAMPLE 3

By reacting 28 parts by weight of the sodium salt of benzoxanthene-carboxylic acid anhydride-sulfonic acid, containing 2.7 sulfo groups, in 500 parts by weight of water with 11 parts by weight of 3-aminophenyl-β-oxethylsulfone in a manner similar to that in Example 2, a dyestuff was obtained which, in form of the free acid, corresponded to the formula

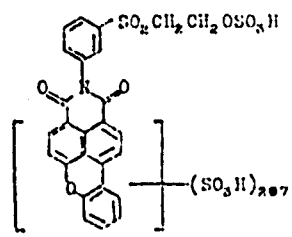

The aqueous solutions of this dyestuff were greenish yellow and showed a green fluorescence.

On wool, the dyestuff yielded greenish yellow dyeings with high brilliancy which were fast to washing.

EXAMPLE 4

23 Parts by weight of benzothioxanthene-dicarboxylic acid-anhydride-disulfonic acid and 11 parts by weight of 1,4-diaminobenzene-2-sulfonic acid were dissolved neutral under addition of sodium hydroxide solution in 300 parts by weight of water and boiled for 20 hours under reflux with addition of 10 parts by weight of glacial acetic acid. Then, 20 parts by weight of β-(2,2,3,3-tetrafluoro-4-methyl-cyclobutyl-1) acrylic acid chloride were added dropwise at 5°–10°C and the acid set free was neutralized by strewing-in sodium carbonate. The dyestuff that had formed was isolated by the addition of a saturated sodium chloride solution. An orange red powder was obtained which was found to dissolve in water to give a reddish yellow solution which, when strongly diluted, showed a green fluorescence.

The new dyestuff corresponded in the form of the free acid to the formula

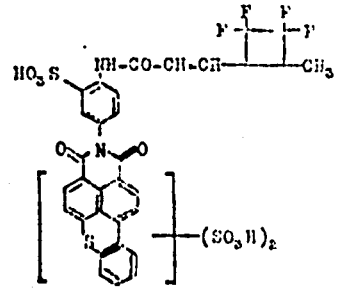

A 2 percent dyeing on polyamide fibers produced in the usual manner in a weakly acetic bath showed, after a treatment with weak alkalis, a bright reddish yellow dyeing having good fastness to washing.

EXAMPLE 5

25 Parts by weight of methoxybenzoxanthene-dicarboxylic acid-anhydride- disulfonic acid were condensed in the neutral range at 100°C in 300 parts by weight of water with 25 parts by weight of 3-nitro-anilino-4-sulfonic acid and the condensation product was subsequently hydrogenated at a hydrogen pressure of 50 atmospheres gauge in the presence of 10 parts by weight of Raney-nickel. The catalyst was removed by filtration and the filtrate was combined with 8 parts by weight of sodium acetate (anhydrous) and 8 parts by weight of 3-chloro-1,2-diazine-6-carboxylic acid chloride, and the reaction was completed by the slow addition of a solution of sodium carbonate in water and stirring for several hours; the dyestuff that had formed was salted out with sodium chloride. An orange red powder was obtained which dissolved in water to give a yellow solution which, when strongly diluted, showed a green fluorescence.

In form of the free acid, the dyestuff corresponded to the formula

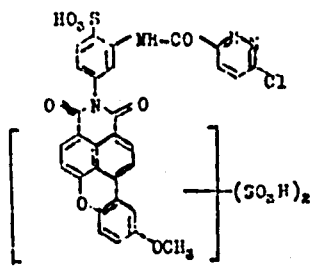

The dyestuff yielded, in the presence of sodium bicarbonate, a brilliant greenish yellow print on cotton which had good fastness to wet processing.

EXAMPLE 6

23 Parts by weight of benzothioxanthene-dicarboxylic acid-anhydride-disulfonic acid and 13 parts by weight of 3-acetamino-anilino-4-sulfonic acid were dissolved neutral in 300 parts of water under addition of sodium hydroxide solution and boiled for 40 hours under reflux. Then, 200 parts by weight of concentrated hydrochloric acid were added and the whole was boiled for 5 hours.

The hydrolysis product, which had been precipitated by means of sodium chloride, was stirred into 300 parts by weight of water, neutralized with sodium hydroxide solution and combined with 5 parts by weight of sodium bicarbonate and 50 parts by weight of ethylene chloride. Then, 16 parts by weight of β-chloroethyl-chlorocarbonyl-[2.2.1]-cycloheptane were added portionwise, during which time the acid set free was neutralized with sodium hydroxide solution. After having stirred for some time, the phases were separated and the dyestuff, which in the form of the free acid corresponded to the formula

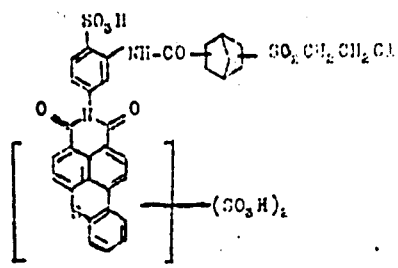

was salted out with potassium chloride from the aqueous phase.

The dyestuff, which was obtained in the form of a yellow red powder dissolved in water to give a reddish yellow solution and showed, when diluted, a green fluorescence. It yielded on cellulose fibers, in the presence of sodium carbonate, brilliant yellow dyeings and prints having good fastness to wet processing.

EXAMPLE 7

10 Parts by weight of the dyestuff obtained according to Example 1 were dissolved in 10 parts by weight of water and the pH-value of this solution was adjusted to 12 by means of sodium hydroxide solution. After having stirred for a short time at this pH-value, the solution was neutralized with hydrochloric acid and the reaction product was salted out with sodium chloride. The dyestuff, which was obtained in the form of an orange red powder corresponded to the formula

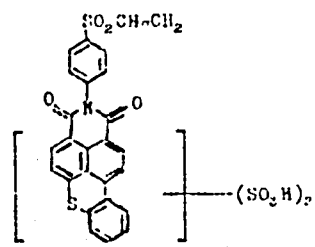

It dissolved in water to give a reddish yellow solution which, when diluted, showed a green fluorescence. When used for dyeing and printing of cellulose fibers in the absence of agents having alkaline action, but when applying an alkaline after-treatment, the dyestuff yielded reddish yellow dyeings and prints which were fast to washing.

EXAMPLE 8

77 Parts by weight of the dyestuff obtained according to Example 3 were dissolved in 800 ml of water and the solution was adjusted to pH 12 by means of sodium hydroxide solution. After having stirred for a short time, the solution was neutralized to pH 6 by means of hydrochloric acid. Then, 25 parts by weight of sodium thiosulfate were introduced at 70°–75°C while maintaining the pH-value at 6 by means of 50 percent acetic acid. After 5 hours the reaction mixture was filtered and the dyestuff of the formula

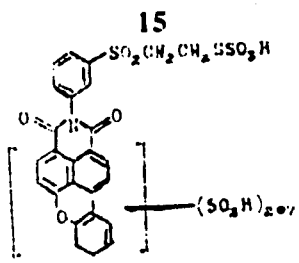

was salted out with KCl.

It dissolved in water to give a yellow solution with a green fluorescence and yielded on a fabric of cellulose fibers, in the presence of sodium hydroxide solution, brilliant greenish yellow prints and dyeings.

In a manner similar to that described in the foregoing Examples, there were prepared the dyestuffs indicated in the following table. They yielded on cellulose materials likewise greenish yellow to reddish yellow dyeings and prints having similarly good properties of fastness.

| Ex. | m | X | $R_5$ | $R_6$ | $R_7$ | $R_3$ |
|---|---|---|---|---|---|---|
| 9 | 1,2 | O | H | H | OCH$_3$ | –C$_6$H$_4$–SO$_2$CH$_2$CH$_2$OSO$_3$H |
| 10 | 2 | O | H | H | H | –C$_6$H$_4$–SO$_2$CH$_2$CH$_2$OSO$_3$H |
| 11 | 1,4 | O | CH$_3$ | H | H | –C$_6$H$_4$–SO$_2$CH$_2$CH$_2$OSO$_3$H |
| 12 | 2,8 | O | H | Cl | H | –C$_6$H$_4$–N(CH$_3$)–SO$_2$CH$_2$CH$_2$OSO$_3$H |
| 13 | 1,1 | S | H | H | H | –C$_6$H$_4$–SO$_2$CH$_2$CH$_2$OSO$_3$H |
| 14 | 1,5 | S | H | H | H | H$_3$CO–C$_6$H$_4$–SO$_2$CH$_2$CH$_2$OSO$_3$H |
| 15 | 2 | S | H | H | H | –C$_6$H$_3$(OCH$_3$)–SO$_2$CH$_2$CH$_2$OSO$_3$H |
| 16 | 2,6 | S | H | CH$_3$ | CH$_3$ | –C$_6$H$_4$–SO$_2$CH$_2$CH$_2$–OPO$_3$H$_2$ |
| 17 | 2 | S | H | H | H | –CH$_2$CH$_2$CH$_2$–SO$_2$CH$_2$CH$_2$OSO$_3$H |
| 18 | 2 | S | H | H | H | –CH$_2$–CH$_2$–C$_6$H$_4$–SO$_2$CH$_2$CH$_2$OSO$_3$H |
| 19 | 2 | S | H | H | H | –C$_{10}$H$_5$(SO$_3$H)–SO$_2$CH$_2$CH$_2$OSO$_3$H |
| 20 | 2 | S | H | H | H | –C$_6$H$_3$(CH$_3$)–CH$_2$SO$_2$CH$_2$CH$_2$OSO$_3$H |
| 21 | 2 | O | H | H | H | –CH$_2$CH$_2$CH$_2$–SO$_2$CH$_2$CH$_2$OSO$_3$H |
| 22 | 2 | S | H | H | H | –CH$_2$–C$_6$H$_4$–CH$_2$CH$_2$SO$_2$CH$_2$CH$_2$OSO$_3$H |

| EX | m | X | $R_b$ | $R_c$ | $R_f$ | $R_a$ |
|---|---|---|---|---|---|---|
| 23 | 2 | S | H | H | H | HOOC—⌬—SO$_2$CH$_2$CH$_2$OSO$_3$H |
| 24 | 2 | S | H | H | H | HO—⌬—SO$_2$CH$_2$CH$_2$OSO$_3$H |
| 25 | 2 | S | H | H | H | —⌬(CH$_2$—SO$_2$CH$_2$CH$_2$OSO$_3$H, CH$_3$, CH$_2$—SO$_2$CH$_2$CH$_2$OSO$_3$H) |
| 26 | 2 | S | H | H | H | —naphthyl—SO$_2$CH$_2$CH$_2$OSO$_3$H |
| 27 | 2 | S | H | H | H | —⌬—⌬—SO$_2$CH$_2$CH$_2$OSO$_3$H |
| 28 | 2,6 | S | H | H | H | —⌬—SO$_2$CH$_2$CH$_2$—N(C$_2$H$_5$)(C$_2$H$_5$) |
| 29 | 2,6 | S | H | H | H | —⌬—SO$_2$CH$_2$CH$_2$Cl |
| 30 | 2 | S | H | CH$_3$ | CH$_3$ | —⌬(SO$_3$H)—NH—CO—CH=CH— |
| 31 | 2 | S | H | H | H | —⌬(SO$_3$H)—NHCO—pyrimidine(Cl,Cl) |
| 32 | 2 | S | H | H | H | —⌬(SO$_3$H)—NH—triazine(Cl,Cl) |
| 33 | 2 | S | H | H | H | —⌬(SO$_3$H)—NH—triazine(Cl)—NH—⌬—SO$_3$H |
| 34 | 2 | S | H | H | H | —⌬(SO$_3$H)—NH—pyrimidine(Cl,Cl,Cl) |
| 35 | 2 | S | H | H | H | —⌬(SO$_3$H)—NHCO—quinoline(Cl,Cl) |
| 36 | 2 | S | H | H | H | —⌬—SO$_2$CH$_2$CH$_2$OR |
| 37 | 2 | CO | H | H | H | —⌬—SO$_2$CH$_2$CH$_2$OCO$_3$H |

We claim:
1. A water-soluble reactive xanthene dyestuff of the formula
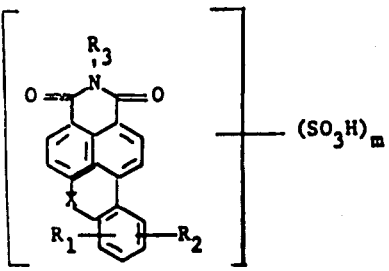
wherein $R_1$ and $R_2$ each is hydrogen, chlorine, bromine, lower alkyl or lower alkoxy, X is sulfur, oxygen or
$R_3$ is
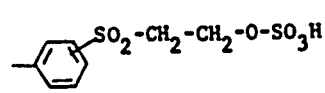 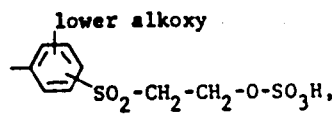
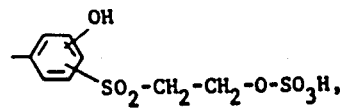 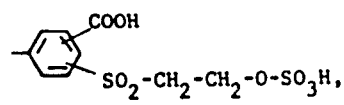
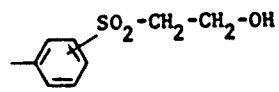 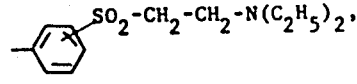
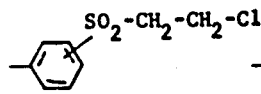 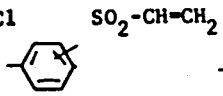 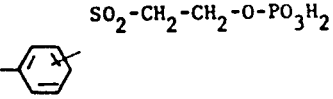
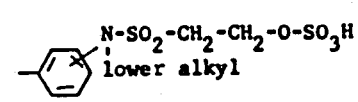 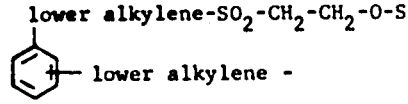
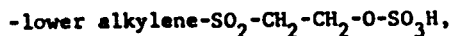
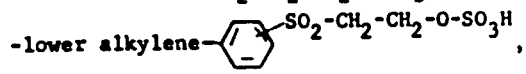
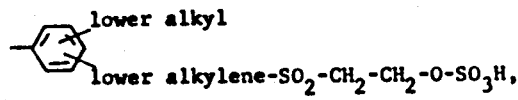
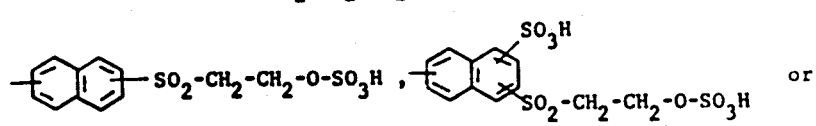 or
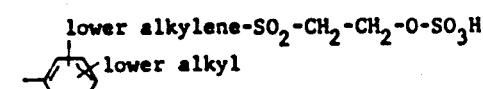
and $\underline{m}$ is a value of 1 to 3.

and $m$ is a value of 1 to 3.
2. The dyestuff of the formula
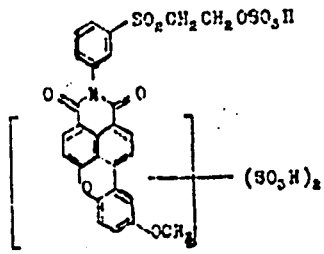
3. The dyestuff of the formula
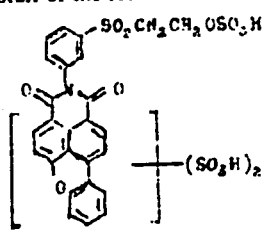
4. The dyestuff of the formula
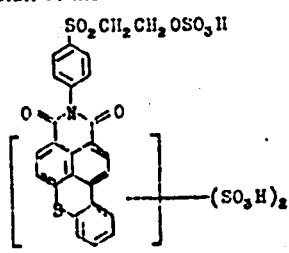
5. The dyestuff of the formula
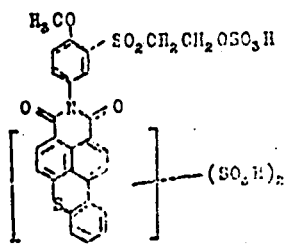
6. The dyestuff of the formula
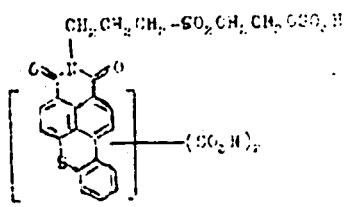
* * * * *